US007328133B2

United States Patent
Utaka et al.

(10) Patent No.: US 7,328,133 B2
(45) Date of Patent: Feb. 5, 2008

(54) METHOD OF MANAGING MAINTENANCE AND MAINTENANCE MANAGING APPARATUS

(75) Inventors: Kenji Utaka, Chiyoda-ku (JP); Kenji Araki, Chiyoda-ku (JP); Kimihiro Kaimori, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/506,559

(22) Filed: Aug. 18, 2006

(65) Prior Publication Data
US 2006/0293866 A1    Dec. 28, 2006

Related U.S. Application Data

(63) Continuation of application No. 11/014,595, filed on Dec. 16, 2004, now Pat. No. 7,117,123.

(30) Foreign Application Priority Data
Dec. 17, 2003    (JP)    ............................. 2003-419316

(51) Int. Cl.
*G06F 11/30*    (2006.01)
(52) U.S. Cl. ..................................... 702/184; 702/185

(58) Field of Classification Search ............ 702/33–35, 702/182–188; 714/25, 47; 376/215
See application file for complete search history.

(56) References Cited

U.S. PATENT DOCUMENTS

| 5,009,833 | A | * | 4/1991 | Takeuchi et al. ............. 376/217 |
| 5,311,562 | A | | 5/1994 | Palusamy et al. ............ 376/215 |
| 6,671,818 | B1 | | 12/2003 | Mikurak ......................... 714/4 |

FOREIGN PATENT DOCUMENTS

| JP | 06-255330 | 9/1994 |
| JP | 11-064210 | 3/1999 |

* cited by examiner

*Primary Examiner*—Bryan Bui
(74) *Attorney, Agent, or Firm*—Crowell & Moring LLP

(57) ABSTRACT

Structural members constructing a plant are classified into a plurality of groups on basis of a likeness criterion of a predetermined operation status. An index member having a higher degradation tendency than the structural members belonging to the group is installed at at least a part of at least one of structural member to generate an inspection plan through actual inspection of the index member to provide reduction in the number of structural members to be inspected and an extended inspection interval without decrease in reliability.

3 Claims, 11 Drawing Sheets

FIG.8

| GROUP | SYSTEM | PLACE NO. | LINE NO. | KIND OF STEEL | CONFIGURATION | TEMP | FLOW VELOCITY | ... |
|---|---|---|---|---|---|---|---|---|
| A | ES | ES-11 | 50B-ES-1 | LOW ALLOY | STRAIGHT PIPE | 34°C | 70 m/s | |
| A | ES | ES-12T1 | 50B-ES-1 | LOW ALLOY | BRANCH PIPE | 34°C | 70 m/s | |
| A | ES | ES-13R1 | 50B-ES-1 | LOW ALLOY | REDUCER | 34°C | 75 m/s | |
| ... | | | | | | | | |
| B | ES | ES-31a | 26B-ES-3 | CARBON | CURVED PIPE | 93°C | 35 m/s | |
| B | ES | ES-32a | 26B-ES-3 | CARBON | STRAIGHT PIPE | 93°C | 35 m/s | |
| B | ES | ES-33a | 26B-ES-3 | CARBON | CURVED PIPE | 93°C | 35 m/s | |
| B | ES | ES-31b | 26B-ES-3 | CARBON | CURVED PIPE | 93°C | 35 m/s | |
| ... | | | | | | | | |

FIG.9

| GROUP | PLACE NO. | KIND OF STEEL | CONFIGURATION | TEMP | FLOW VELOCITY | · · · | PREDICTION WALL THINNING RATE |
|---|---|---|---|---|---|---|---|
| A | ES-11 | LOW ALLOY | STRAIGHT PIPE | 34°C | 70 m/s | | 0.02 mm/kh |
| A | ES-12T1 | LOW ALLOY | BRANCH PIPE | 34°C | 70 m/s | | 0.03 mm/kh |
| A | ES-13R1 | LOW ALLOY | REDUCER | 34°C | 75 m/s | | 0.05 mm/kh |
| · · · | | | | | | | |
| B | ES-31a | CARBON | CURVED PIPE | 93°C | 35 m/s | | 0.09 mm/kh |
| B | ES-32a | CARBON | STRAIGHT PIPE | 93°C | 35 m/s | | 0.08 mm/kh |
| B | ES-33a | CARBON | CURVED PIPE | 93°C | 35 m/s | | 0.09 mm/kh |
| B | ES-31b | CARBON | CURVED PIPE | 93°C | 35 m/s | | 0.09 mm/kh |
| · · · | | | | | | | |

FIG.10

| GROUP | PLACE NO. | KIND OF STEEL | CURRENT THICKNESS | NECESSARY MINIMUM THICKNESS | PREDICTION WALL THINNING RATE | INSPECTION FREQ |
|---|---|---|---|---|---|---|
| A | ES-13R1 | LOW ALLOY | 8.1 mm | 0.40 mm | 0.05 mm/kh | EVERY EIGHT YEARS |
| | | ↓ CHANGE | | | | |
| | REPRESENTATIVE PART | CARBON | 8.1 mm | 2.50 mm | 0.15 mm/kh | EVERY TWO YEARS |
| ... | | | | | | |

FIG.11

| GROUP | PLACE NO | KIND OF STEEL | NOMINAL THICKNESS | MANUFACTURING TOLERANCE | VALUES IN FIRST MEASUREMENT | LATEST MEASUREMENT VALUES | JUDGMENT OF WALL THINNING |
|---|---|---|---|---|---|---|---|
| A | ES-13R1 | LOW ALLOY | 8.1 mm | 1.2 mm | 7.9 mm | ← | NO |
| | | ↓ CHANGE | | | | | |
| | REPRESENTATIVE PART | CARBON | 8.1 mm | 1.2 mm | 7.9 mm | 6.8 mm | YES |
| ... | | | | | | | |

FIG.12

| GROUP | PLACE NO. | REMAINING THICKNESS | PIPE WALL THINNING RATE | LIFE EXPECTANCY | IMPORTANCE DEGREE OF EACH GROUP | NEXT INSPECTION |
|---|---|---|---|---|---|---|
| A | ES-11 | 6.5 mm | ↑ | 54 kh | HIGH | ↑ |
| A | ES-12T1 | 6.5 mm | ↑ | 54 kh | HIGH | ↑ |
| A | REPRESENTATIVE PART | 4.5 mm | 0.12 mm/kh | 36 kh | HIGH | AFTER TWO YEARS |
| ... | | | | | | |
| B | REPRESENTATIVE PART | 4.8 mm | 0.10 mm/kh | 48 kh | LOW | AFTER FOUR YEARS |
| B | ES-32a | 5.0 mm | ↑ | 50 kh | LOW | ↑ |
| B | ES-33a | 4.9 mm | ↑ | 49 kh | LOW | ↑ |
| B | ES-31b | 4.9 mm | ↑ | 49 kh | LOW | ↑ |
| ... | | | | | | |

METHOD OF MANAGING MAINTENANCE AND MAINTENANCE MANAGING APPARATUS

CROSS-REFERENCE TO A RELATED APPLICATION

This application claims benefit of the filing date of Japanese Application No. 2003-419316 filed Dec. 17, 2003, which incorporated herein by reference.

FIELD OF THE INVENTION

This invention relates to a method and apparatus for managing maintenance of structural members constructing a plant such as devices and piping and particularly to a method and apparatus for efficiently managing maintenance of structural members.

BACKGROUND OF THE INVENTION

In nuclear power plants or various plants, devices, piping, and the like constructing the plant need to be periodically inspected for checking degradation statuses including material degradation, corrosion tendencies, cracks, and other deficiencies, which can provide a future preventive maintenance plan on the basis of the result to provide, for example, a plan indicative of a maintenance timings or replacement timings of structural members. Generally, there are various types of structural members such as devices and piping constructing the plant depending on their configurations and functions and thus the number of installed structural members is large. Accordingly, in order to prevent failure and damage, it is required to specify parts having tendencies of degradation to provide sophisticated advancing degradation progression prediction to conduct inspection or diagnosis within a period for which the parts have soundness and are in service. This provides maintenance in accordance with the degradation status.

For example, Japanese laid-open patent application publication No. 11-64210 discloses a technology in which a sample pipe for inspection is arranged in a piping system to be periodically removed for inspection to predict degradation statuses including corrosion, deficiency and progression of damage on the basis of the inspection result. The sample pipe is arranged at a location showing a higher possibility of degradation or damaging than other locations in the piping system. Further, Japanese laid-open patent application publication No. 6-255330 discloses a technique in which a ring with a notch formed with a material having a shorter life than a structural member to be inspected is fixed to a part of the structural member. The ring is periodically inspected for predicting the life of the structural member to be inspected.

In the methods of managing maintenance, to increase reliability in degradation prediction of structural members, it is preferable to provide a lot of index members. However, inspection should be completed within a certain period, for example, one month, which limits the number of index members. If an excessive number of index (monitoring) members are installed in comparison with the period, non-inspected index members will exist. This will increase possibility of deficiency.

Then, it may be considered to install index members at locations experimentally showing a high degradation. However, in this case, the prediction may be done on the excessively safe side. Thus, the inspection interval for general structural members will be too short, which increases the cost of the maintenance.

SUMMARY OF THE INVENTION

An aspect of the present invention provides a method and apparatus for managing maintenance of facilities constructing a plant, in which the number of the members to be inspected can be reduced or the period of inspection can be elongated without decrease in reliability.

A further aspect of the present invention provides a method of managing maintenance comprising the steps of: (a) grouping structural members of the plant on the basis of a likeness criterion of a predetermined operation status into a plurality of groups; and (b) installing an index member to be inspected at least a part of at least one of the structural members belonging to each group, the index member having a higher degradation tendency than the other structural members in the group.

In this case, the degradation of the structural members belonging to each group is predicted and estimated to provide degradation tendencies (trends). At least one structural member having a higher degradation tendency than the others in each group is selected. The degradation of each structural member is estimated on the basis of degradation prediction data in consideration of design information, operation information, and maintenance history information (past maintenance record).

Here, the likeness criterion of the operation status is determined on the basis of a circumstance under which each of the structural member is used and which is a factor influencing on the degradation of the structural members and on the basis of a method of using the structural member that provides different degradation judging criteria. The adopted circumstances are environmental statuses under which the structural members are used, such as a kind of fluid, a pressure, a pressure variation, a temperature, a temperature variation, a flow rate, an amount of dissolved oxygen, and whether the flow is two-phase flow or not. The used circumstances considerably influence structural members constructing devices and parts of a plant, so that likeness criterion of the operation status is determined such that the structural members of which used circumstances are similar are included in the same group.

The method of use represents importance (significance) or the like of the system in which the structural member is used. For example, importance depends on whether the structural member is used in a safety system of the plant or a control system for an output of the plant. Thus, regarding the method of use, a likeness criterion of operation status is so set that the structural members subjected to similar methods of use regarding, for example, importance of systems in which the structural members are used are included in the same group, wherein the importance depends on whether the structural member is used in a safety system or in a control system for output or the like for example. More specifically, a safety system requires perfect operation, but an output control system has a wide allowable range of degradation because another system can relieve the output control system. Further, in addition to the used circumstance and the methods of using the structural member, it is preferable to consider design information and maintenance history information, of the structural member as the likeness criteria of the operation status.

As mentioned above, the structural members grouped on the basis of the predetermined likeness criterion of operation status show similar degradation tendencies. Then, in order to make high reliable judgment, with a high reliability, degradation of the structural members belonging to the group, instead of at least one structural member having a large degradation tendency in each group or in at least a part of the structural member, an index structural member of which material or structure has a higher degradation tendency than the structural member is set and installed as an inspection object. The index member is inspected with priority in checking for the tendency of degradation to judge the tendencies of degradation of other members belonging to the group with a high reliability.

The degradation of each structural member belonging to each group is estimated on the basis of degradation prediction data of structural members in consideration of design information, operation information, and maintenance history information to determine the tendency of degradation. Here, the tendency of degradation is judged in accordance with degradation occurrence potential relating to a degradation occurrence frequency and a degradation rate. The design information of the structural members includes, for example, materials, configurations, and in case of an apparatus such as a valve, its type and used mode. The maintenance history information includes an initial status, inspection histories (good/no good), repairing histories, replacement histories, and the like.

BRIEF DESCRIPTION OF THE DRAWINGS

The object and features of the present invention will become more readily apparent from the following detailed description taken in conjunction with the accompanying drawings in which:

FIG. 8 is a table of an example of classified bleed pipes in a nuclear power plant;

FIG. 9 is a table of an example of predicted wall thinning of each bleed pipe in FIG. 8;

FIG. 10 is a table of an example of setting index member according to the present invention;

FIG. 11 is a table of an example of judgment result as to presence/absence of wall thinning on the basis of inspection data of the index member according to the present invention; and FIG. 12 is a table of an example of an inspection plan for general structural members on the basis of the inspection result of the index member according to the present invention.

The same or corresponding elements or parts are designated with like references throughout the drawings.

DETAILED DESCRIPTION OF THE INVENTION

Modes in a method of managing maintenance according to the present invention will be described with reference to drawings.

[Mode 1]

Figure 1:
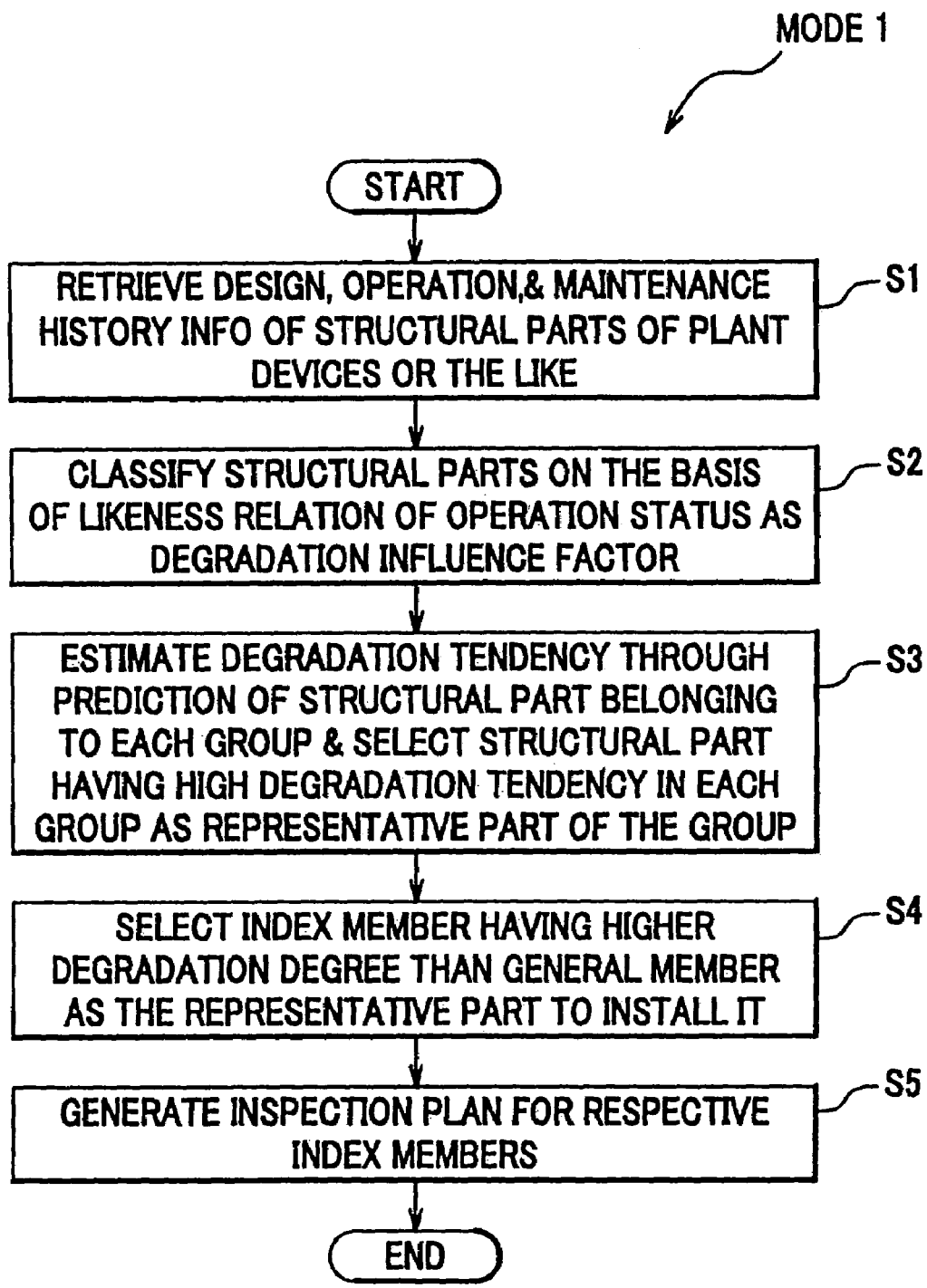
FIG. 1 depicts a flow chart of processing in the Mode 1 according to the present invention.
Figure 2:
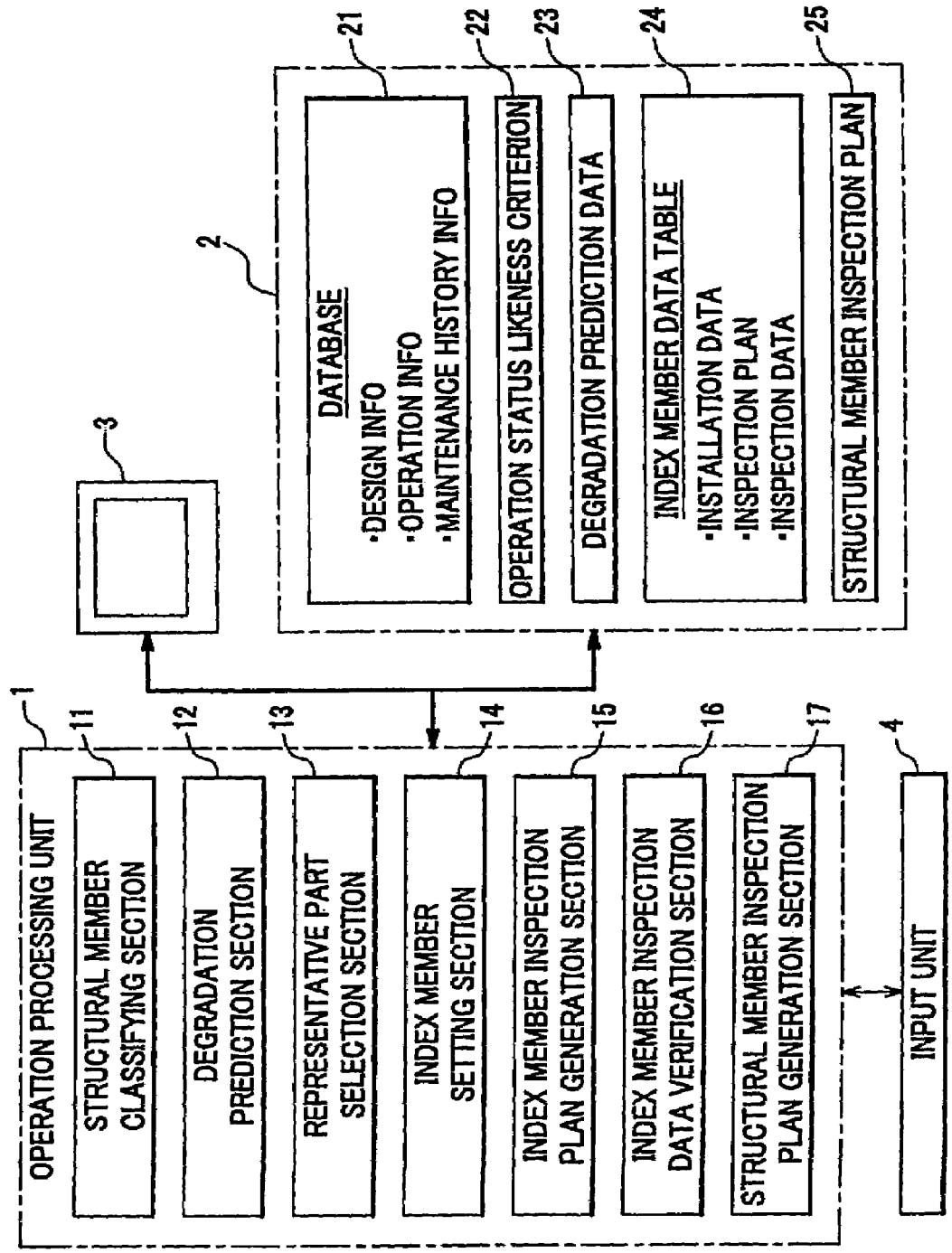
FIG. 2 is a block diagram of a maintenance managing apparatus according to the present invention.

FIG. 1 describes operation in Mode 1 of generating an inspection plan. FIG. 2 illustrates a schematic block diagram of a maintenance management apparatus suitable for carrying out a method of managing maintenance (preventive maintenance).

The maintenance management apparatus comprises, as shown in FIG. 2, an operation processing unit 1 comprising a computer or the like, a storing unit 2, a display unit 3, and an input unit.

The operation processing unit 1 executes a maintenance management preparation process and a maintenance plan generation process. The maintenance management preparing process includes a structural member classifying section 11, a degradation prediction section 12, a representative part selection section 13, an index member setting section 14, and an index member inspection plan generation section 15.

The maintenance plan (program) generation process includes an index member inspection data verification section 16 and a structural member inspection plan generation section 17.

The storing unit 2 stores a database 21 including design information, operation information, and maintenance history information, of the plant to be maintained, an operation status likeness criterion 22 of operation status, degradation prediction data 23, an index member data table 24 including installation information of the index member, an inspection plans, and inspection records.

The method of managing maintenance having the above-mentioned structure will be described with reference to the flow chart shown in FIG. 1.

Step S1

The structural member classifying section 11 searches the database 21 in the storing unit 2 to retrieve the design information, the operation information, and the maintenance history information, of structural parts (the whole or a part of a structural member) of devices or piping which constructs the plant.

Step S2

Figure 3:
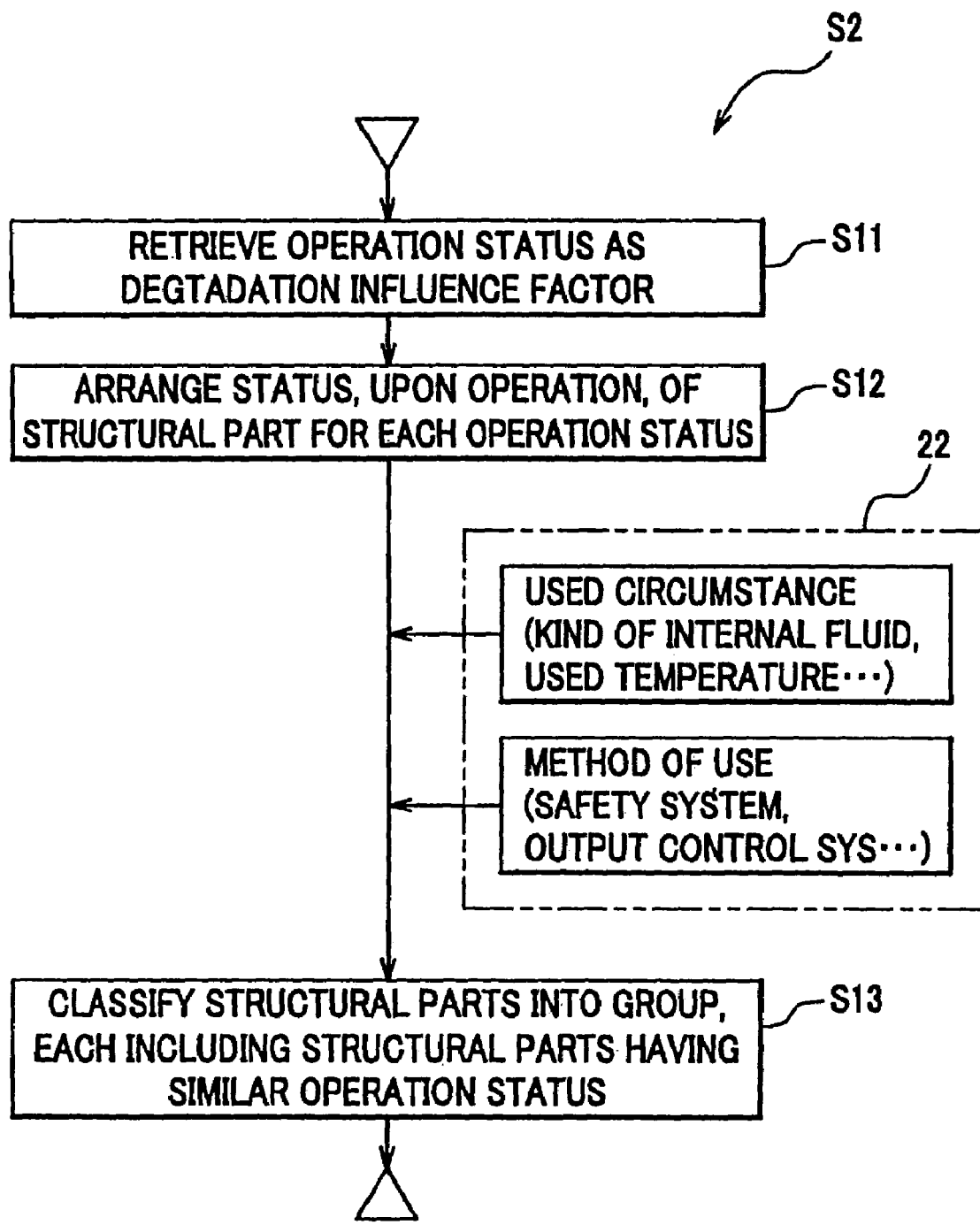
FIG. 3 depicts a detailed flow chart of step S2 in FIG. 1 for classifying.

The structural member classifying section 11 classifies structural members of the plant into a plurality of groups on the basis of predetermined likeness criterion for operation statuses, the structural members in each group having similar degradation tendencies. More specifically, as shown in a detailed flow chart in FIG. 3, operation statuses of respective structural members as degradation influence factors are retrieved from the database 21 of the storing unit 2 (S11). After this, respective structural parts are estimated regarding the operation statuses and are arranged with the estimation result (S12). With reference to the operation status likeness criterion 22, the structural parts are classified into groups, in which the structural members having similar operation statuses are classified into the same group (S13).

Here, the operation status likeness criterion 22 is determined on the basis of circumstances under which the structural members are used and which are a degradation influence factor and on the basis of methods of using the structural members which provide different degradation judging criteria. The used circumstances are environmental statuses under which structural members are used, such as a kind, a pressure, a pressure variation, a temperature, a temperature variation, a flow rate, an amount of dissolved oxygen, of an internal fluid, and a used circumstance depending on whether the flow is two-phase flow or not. The used circumstances considerably influence structural members constructing devices and parts in the plant, so that likeness criterion of the operation status is so set that structural parts that are used under similar circumstances are included in the same group.

The methods of use represents importance or the like of the system in which the structural member is used, such as whether the structural member is used in a safety system of the plant or a control system for an output of the plant. Thus, regarding the method of use, a likeness criterion of operation status is so set that the structural parts having similar methods of use are included in the same group. For example, the safety system should support perfect plant operation, but the output control system has a wide allowable range of degradation because another system can relieve the output control system. Further, in addition to the used circumstance and the methods of using the structural members, it is preferable to consider design information and maintenance history information as the likeness criteria of the operation status.

Further, the operation status likeness criterion 22 can be set in consideration of the design information and the maintenance history information, of structural parts in addition to the used circumstance and the method of use.

Step S3

Although the structural parts grouped into a group in step S2 have a similar tendency of degradation (hereinafter referred to as a degradation tendency), among the structural parts in one group, there is still difference in operation statuses in accordance with the specific individual structural parts and in the structure or the configuration having probability of suffering influence on the degradation. This provides prediction in tendencies of degradation of respective structural parts, and a structural part having the highest degradation tendency is selected as a reprehensive part of the group. A plurality of representative parts may be selected in a group.

Figure 4:
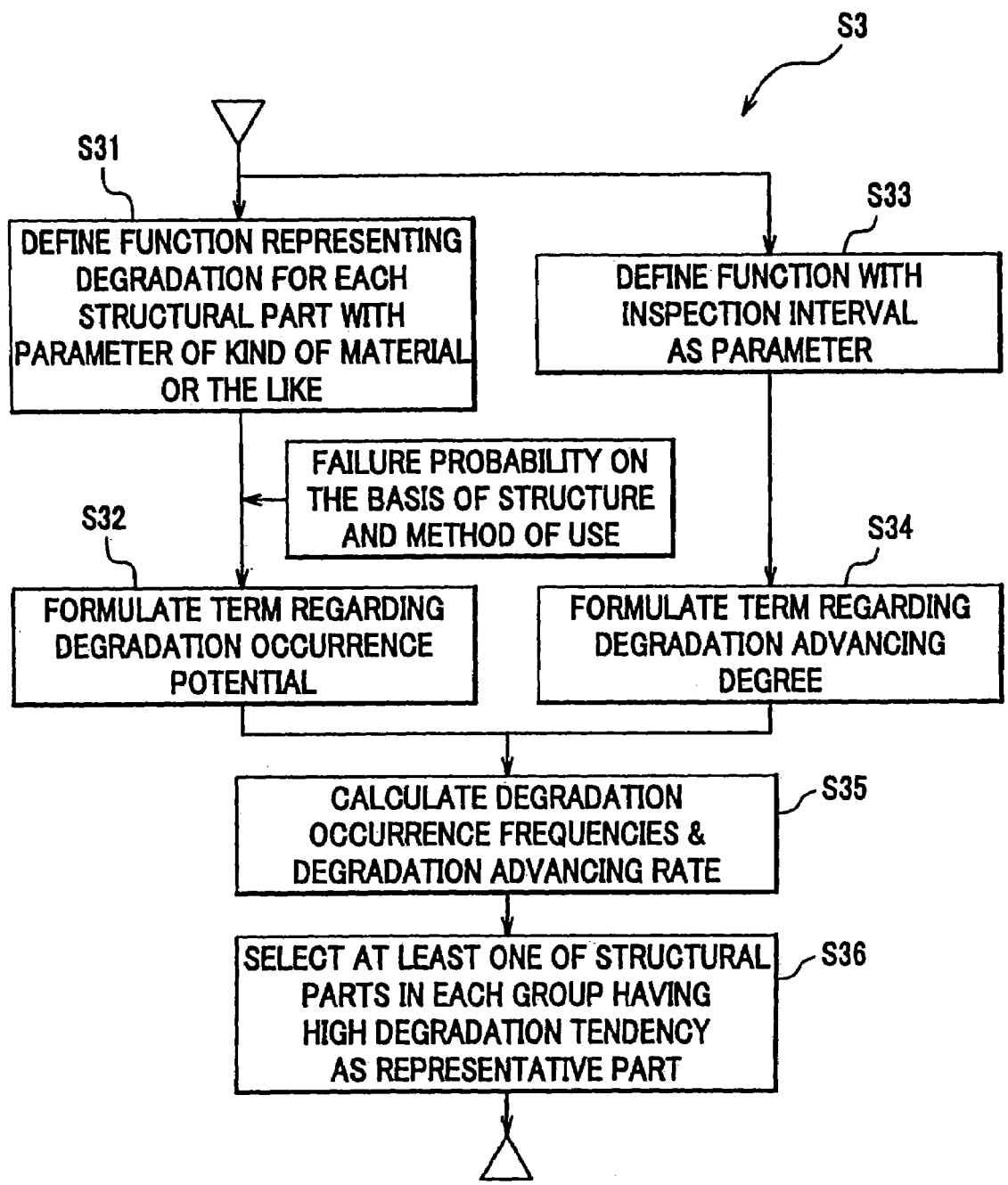
FIG. 4 depicts a detailed flow chart of step S3 in FIG. 1 for selecting a representative part.

FIG. 4 describes selecting a representative structural part. The degradation tendency of a structural part is determined in consideration of a degree of degradation occurrence potential determined in accordance with the type of material (hereinafter referred to as material type) and a degree of degradation advancing depending on time (degradation advancing degree). First, a function representing degradation for each structural part is defined with the type of the structural part being used as a parameter (S31). For example, in the case of a structural member are always placed under a circumstance satisfying the degradation statuses such as fatigue, cavitation erosion, it is apt to have degradation as time passes, so that the function can be defined by a product of a sum of probabilities of respective parameters of materials and the like multiplied by time. In this case, assuming the degradation function is F (Ri) and time is t, the function is give by:

$$F(Ri)=(R1+R2+\ldots+Rn)\times t \quad (1)$$

where i=1, 2, . . . n.

Further, in the case of a structural member of which degradation occurrence is determined by the probability theory as to whether degradation is present or absent, though the structural member is placed under a circumstance satisfying degradation statuses such as stress-corrosion cracking, erosion corrosion, or the like, its time-dependency is low, allowing the function to be defined by a sum of respective of parameters such as kinds of the materials. The degradation function in this case is f (Ri) given by:

$$f(Ri)=R1+R2+\ldots+Rn \quad (2)$$

where i=1, 2, . . . n.

On the basis of this function, the term regarding the degradation occurrence potential is formulated in consideration of a failure probability (for example, a known value in a disclosed document is used) in the degradation prediction data determined on the basis of the structure and the method of use (S32). For example, the degradation occurrence potential Pv of a part having a valve is represented, with that assumption the failure probability according to the kind of the material is Rm, a failure probability according to the structure is Rs, and a failure probability on the basis the method of use is Ro, by:

$$Pv=f(Rm, Rs, R_0)=Rm+Rs+R_0 \quad (3)$$

The higher the degradation occurrence potential Pv, the shorter the interval up to occurrence of degradation. This provides the common concept between the degradation occurrence potential Pv and the degradation occurrence frequency, which requires to increase the inspection frequency in accordance with a magnitude of the degradation occurrence potential Pv.

On the other hand, regarding the degradation advancing degree, its function is defined with an inspection interval as a parameter (S33), and the term of the degradation advancing degree is formulated (S34). The function of the degradation advancing degree can be represented by, for example, a monotonously increasing function regarding time. Thus, the degradation advancing degree can be provided by consideration of a degradation advancing rate V represented by the following Equation (4) in which an amount C of variation in the degradation advancing degree for a given interval is divided by the elapsed time T. In Equation (4), D1 and D2 represent degradation advancing degrees at time T1 and T2, respectively.

$$V=C/T=(D1-D2)/(T2-T1) \quad (4)$$

As mentioned above, on the basis of Equations (1) and (2), the degradation occurrence frequencies and degradation advancing rates of structural members included in each group are calculated (S35). In this process, the design information, the operation information, and the maintenance information, of structural members can be considered for the prediction of the degradation tendency. After that, the estimation results of the degradation tendencies of respective members are compared with each other in each group to select at least a structural part having a high degradation advancing rate among the structural members included in each group as a reprehensive structural member of the group (S36).

Step S4

Instead of the structural part selected in step S3, an index member of which material or structure has a larger degradation tendency than the material or structure of the selected structural member is set and installed as an object of inspection. More specifically, the material and the structure of the index member are determined such that the index member has a degradation degree (degradation tendency) higher, at a given rate, than that of other structural parts in the same group.

Increase in the degradation degree is provided by selecting a material having a corrosion resistance of, for example, a half of that of the other general structural parts for the index member. Particularly, upon setting the degradation degree of the index member, it is preferable to use a structure or a part having a degradation tendency of which difference from the general structural members is known. Data of the installation place, the material, the structure, and the like, of the index member is stored in the index member data table 24. The index member is installed as described above, and the index member is inspected regarding the degradation tendency, which provides prediction and estimation of the degradation tendencies of general structural members with a high accuracy.

Step S5

An inspection plan for the index member set and installed in step S4 is prepared. In the inspection plan, an inspection frequency is determined to enable detection of degradation in the installed index member at an earlier stage. More specifically, prior to other members, the index member is inspected concurrently with the interval and the period of a periodic maintenance to check the degradation tendency of the index member. The generated inspection plan of the index member is stored in the index member data table 24. This provides judgment of the degradation tendencies of the other structural parts which belongs to the same group.

As mentioned above, according to the Mode 1 shown in FIG. 1, the structural members (parts) of the plant are classified into a plurality of groups on the basis of the predetermined likeness criterion of the operation status, and an index member having a higher degradation tendency than other structural members (parts) is set and installed as the inspection object, wherein the installation location and the number of the index members can be rationally determined.

Further, checking the degradation tendency of the installed index member increases the accuracy in the estimation through prediction, of the degradation tendencies of general structural members.

[Mode 2]

Figure 5:
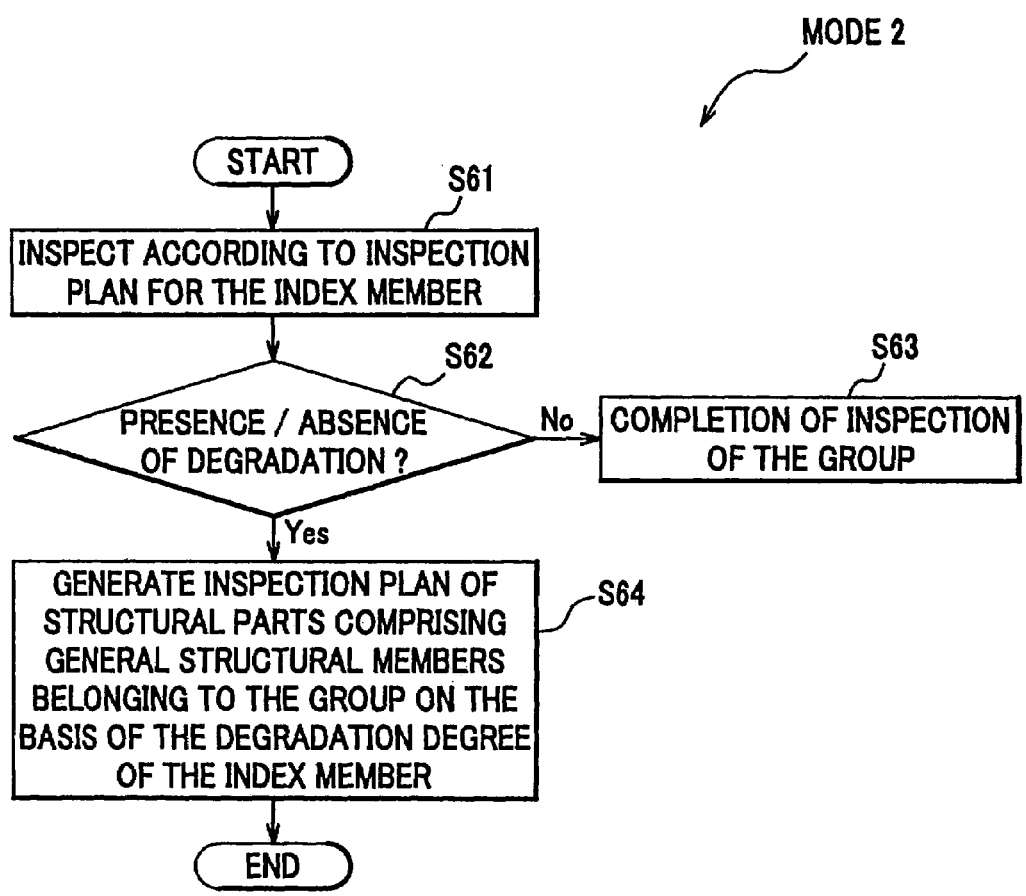
FIG. 5 depicts a flow chart for generating an inspection plan in Mode 2 according to the present invention.

FIG. 5 describes an actual maintenance management carried out in Mode 2 with the inspection plan of the index member generated in the Mode 1 illustrated in FIG. 1. The index member inspection data verification section 16 and the structural member inspection plan generation section 17, shown in FIG. 2, carry out the maintenance management. As shown in FIG. 5, the inspection is carried out in step with the timing and period of the periodic repair of the plant in accordance with the inspection plan of the index members. In the inspection, the index members are inspected with respect to degradation statuses including corrosion, occurrence and proceeding of damage, or the like in a status that the index members are removed or not removed (S61).

Figure 6:
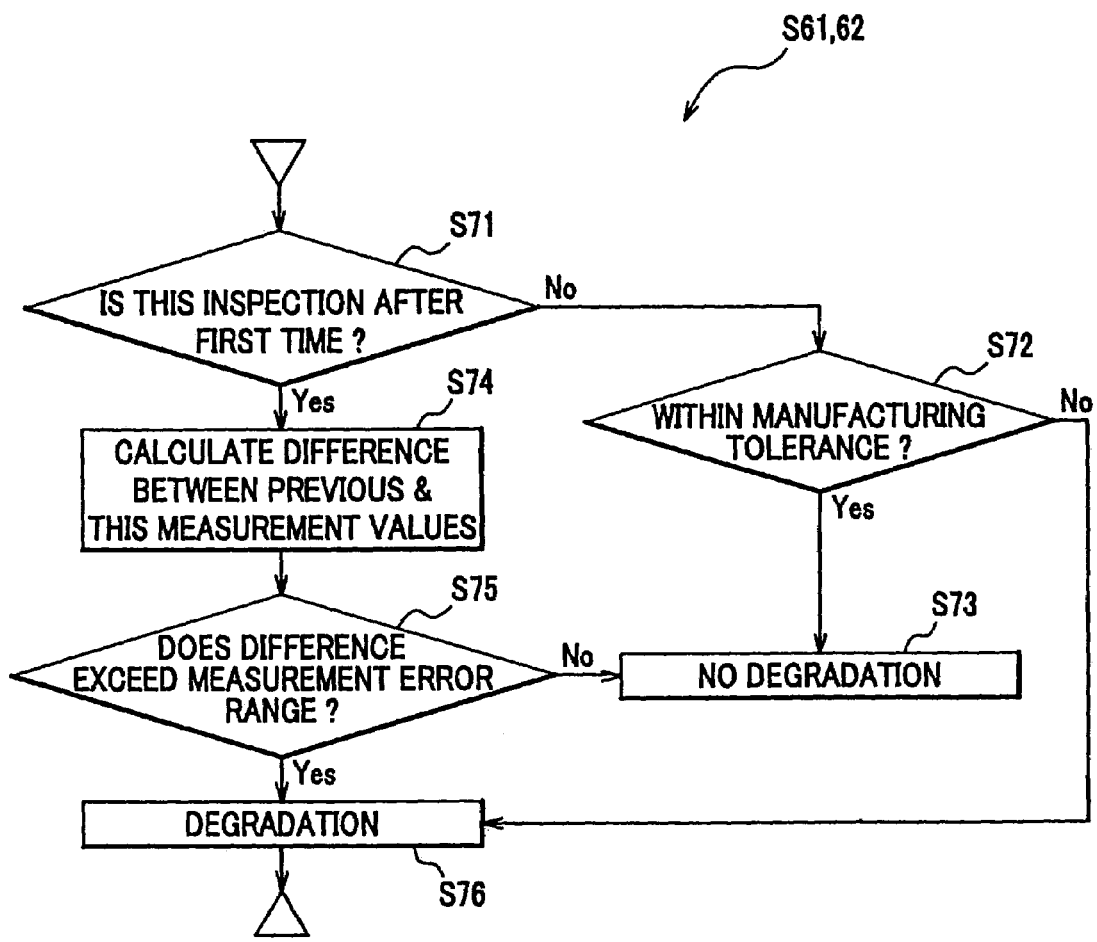
FIG. 6 depicts a flow chart of a subroutine shown in FIG. 5 for judging degradation of an index member.

The inspection data verification section 16 for the index member judges whether degradation is present or absent on the basis of the inspection result of the index member (S62). If no degradation is found, the inspection of the group is completed (S63). In this step S63, a correction may be made to extend the inspection interval to the next inspection. The presence or the absence of degradation is judged in accordance with the steps shown in the flow chart in FIG. 6. First, it is judged whether this inspection of the index member is the first time or after the first time (S71). If the inspection is carried out at the first time, it is judged whether the actual measurement value (for example a thickness of a wall) in consideration of a measurement error is within a range of the manufacturing tolerance (S72). If the actual measurement value is within the range of manufacturing tolerance, it is judged that there is no degradation (S73). If the inspection is after the first time, a difference between the actual measurement value and that of the preceding inspection is obtained (S74). If the difference is within the range of the manufacturing tolerance, it is judged that there is no degradation (S75, S73). If the difference exceeds the range of the manufacturing tolerance, it is judged that there is degradation (S75, S76). The inspection record of the index member is stored in the index member data table 24.

If it is judged there is degradation in step S76, the structural member inspection plan generation section 17 proceeds to step S64 in FIG. 5 to generate an inspection plan of other structural members (parts) belonging to the same group on the basis of the degradation tendency of the index member (S64).

Figure 7:
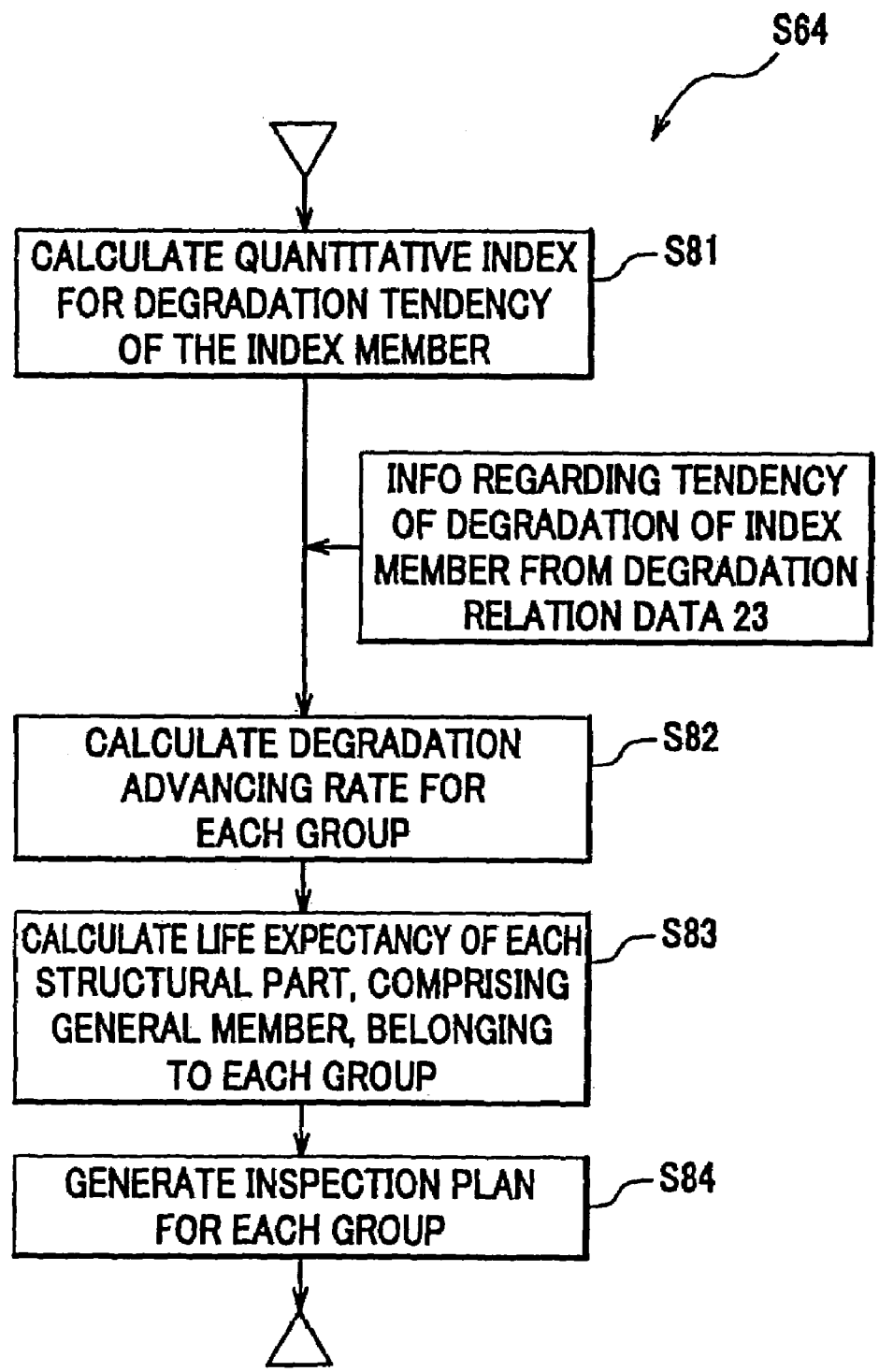
FIG. 7 depicts a flow chart of a subroutine shown in FIG. 5 for generating an inspection plan for structural members in accordance with the inspection result of the index member.

FIG. 7 illustrates detailed steps of generating the inspection plan shown in step S64. First, the degradation advancing rates are calculated from the degradation tendencies of respective index members, and a degradation advancing rate of each index member is defined as a quantitative index of degradation tendency for the group to which the index member belongs (S81). After that, the inspection plan of the group calculates a degradation tendency of the whole of the group from the degradation tendency of the representative locations on the basis of the difference in the degradation degree between the previously installed representative places and other places. Further, degradation advancing rate is calculated for each group (S82).

Life expectancies of respective structural member are obtained from the calculated degradation tendency or the degradation advancing rate (S83) to generate an inspection plan of the respective structural members belonging to the group (S84). The inspection plans of respective structural members generated as mentioned above is stored in the table 25.

As described above, according to the Mode 2, the structural members (structural parts) for which maintenance is to be managed are so classified into groups that operation statuses of each group as degradation influence factors are similar. The index member installed at a place showing a high degradation tendency within the group is inspected prior to other structural members (structural parts). The inspection plan of the general structural members in the group is generated on the basis of the degradation tendency obtained by the inspection. This increases the certainty in the estimation through prediction, of degradation of the general structural members as well as rationally plans an inspection frequency or an inspection interval for the general structural members, with improvement in reliability of the maintenance management of the plant.

EMBODIMENT

Will be described an embodiment in which the method of managing maintenance according to the present invention is applied to a nuclear power plant.

On the basis of the design information, operation information, and maintenance history information, of the nuclear power plant, structural members are classified into groups in which the structural members having similar operation statuses are classified into the same group, for example, as shown in FIG. 8. FIG. 8 exemplarily shows classification on the basis of piping systems. For example, air bleed systems (ES) are classified into a plurality of groups represented by line numbers (in the example, groups A, B . . . ). The piping systems belonging to each group are classified mainly according to likeness in kinds of steel (low-alloy, carbon steel), temperatures (34° C., 93° C., . . . ), and flow rates (70 m/s, 35 m/s, . . . ).

The degradation tendencies of piping which belongs to each group classified as mentioned above is estimated through prediction on the basis of the design information, operation information and maintenance history information, of the piping. For example, as a degradation phenomenon, there is a phenomenon that a thickness of piping decreases particularly by erosion or corrosion, namely, so-called pipe wall thinning (wall thinning), which is estimated. FIG. 9 shows an example of the prediction and estimation result in which rates of pipe wall thinning are represented by amounts of wall thinning per a unit time interval as corrosion resistances against pipe wall thinning in each pipe of each group.

As clearly understood from the drawing, with notifying average and maximum rates of pipe wall thinning in each group, a part or place is predicted to distinctively show the pipe wall thinning tendency earlier than other members in each group is selected as a representative part. For example, in a group A in FIG. 9, a part number of ES-13R1 having a largest predicted pipe wall thinning rate is selected as the representative part. In a group B, at least one part is selected from a plurality of curved pipes having largest predicted pipe wall thinning rates.

At a representative part (place) of each group, a pipe employing a structure or a part showing a higher pipe wall thinning tendency than other parts in each group is installed as an index member. In this operation, properly using two types of materials, namely, carbon steel and low-alloy steel having different corrosion resistances against the pipe wall thinning, differentiates the pipe wall thinning tendency of the representative part from other general pipes.

FIG. 10 shows an example of setting an index member at the part number ES-13R1 using difference in the pipe wall thinning tendency between carbon steel and low-alloy steel, in which type of steel is changed from low-alloy steel to carbon steel. As shown in the drawing, if the type of steel is changed from low-alloy steel to carbon steel, the minimum thickness of the wall necessary for satisfying a design strength criterion also changes. In consideration of this, a value corresponding to the remaining thickness is obtained by subtracting the necessary minimum thickness value from the current value of thickness and further divided by the predicted pipe wall thinning rate to provide an inspection frequency which is shorter than the life expectancy.

As shown in FIG. 10, if the type of steel of the pipe selected as the representative part of the group is changed from low-alloy steel to carbon steel, the necessary minimum thickness value in design should be changed from 0.40 mm to 2.50 mm, which decreases the value corresponding to the remaining thickness of the wall from 7.7 mm to 5.6 mm. In addition, the predicted pipe wall thinning rate becomes 0.15 mm/kh which is three times that in the case of low-alloy steel, so that the life expectancy becomes about 37 kh, which approximately corresponds to three to four years. Thus, the reasonable inspection frequency for anticipatively preventing damage and leakage due to pipe wall thinning is considered to be about two years.

As described above, when the index pipes installed at respective representative (monitoring) places (parts) are determined, the inspection frequencies of representative parts are set to detect the pipe wall thinning at earlier stages, respectively. On the basis of the set inspection frequencies, the representative parts are inspected upon periodic inspections or the like prior to other parts. From the inspection result, it is judged whether the pipe wall thinning is present or absent. In the presence of the pipe wall thinning, this wall thinning tendency is considered as a quantitative index of the class.

FIG. 11 shows an example of judgment of the presence or the absence of the pipe wall thinning from the inspection result of the representative parts.

At the first measurement of the index pipe installed at a representative place of the group A, a value obtained by adding measurement error as ±0.3 mm to a thickness measurement value of 7.9 mm is within the range obtained by adding ± (manufacturing tolerance) to the nominal thickness, which results in judgment of no pipe wall thinning. In this case, other structural members, having lower pipe wall thinning rates, are judged to require no inspection, and the inspection of the group is completed.

On the other hand, in the latest measurement of the index pipe installed at the representative part of the group, a difference between the previous measurement value of 7.9 mm and the current measurement value of 6.8 mm exceeds the range of measurement error, which is judged to have the pipe wall thinning. In this case, the quantitative index for the pipe wall thinning tendency, i.e., the pipe wall thinning rate, is obtained to generate the inspection plan of the group.

FIG. 12 shows an example of a generated inspection plan. The pipe wall thinning rate upon the latest measurement for the representative part of the group A is calculated to be 0.12 mm/kh by dividing the decrease in the pipe wall thickness of 1.1 mm by the measurement interval of 9.5 kh. With this value, life expectancies of pipes belonging to the group are calculated to generate an inspection plan to conduct thickness measurement before any of the pipes reaches the lifetime.

The calculated life expectancy of each pipe belonging to the group A ranges from 36 kh to 54 kh. This requires inspection once 36 kh. Thus, the term to the next inspection may be determined to be four years at the maximum. However, in consideration of the fact that the group A has a high significance (importance) in operation of the plant, it is preferable to determine the inspection frequency on the safety side. Thus, it is determined that the next inspection is to be carried out after two years.

Similarly, consider an inspection plan for the group B. A pipe wall thinning rate of the representative part is 0.10 mm/kh, which results in life expectancies of pipes belonging to the group B ranging from 48 Kh to 50 kh. Thus, it is determined that the next inspection is to be conducted after five years at the maximum. However, in consideration of the fact that the group B has a less significance in operation of the plant, extending the inspection interval as long as possible provides an economical operation. Then, the next inspection is determined to be conducted after four years.

As mentioned above, a method of managing maintenance in the Mode 1 is applied to the maintenance plan of pipes of a nuclear power plant. As a result, the average number of inspection places of the group A once periodic inspection, decreases from, for example, 26 to 3. Similarly, in the group B, the number of inspection places decreases from 58 to 11.

Thus, according to the present invention, the degradation tendency is detected from the inspection of a representative part to decrease the number of inspection places (parts) to reduce the cost of inspection with safety being kept. Further, the saved inspection cost can be transferred to inspection of parts which have not been inspected due to economical reasons though they are objects of inspection or to repairing or replacement in maintenance operations. This provides a method of managing maintenance that is superior in safety to the conventional method with the same cost.

What is claimed is:

1. A maintenance managing apparatus for a plant, comprising:

structural member grouping means for grouping structural members of the plant on the basis of likeness criterion of a predetermined operation status into a plurality of groups; and index member setting means for setting an index member to be inspected at at least a part of at least one of the structural members belonging to each group, the index member having a higher degradation tendency than the other structural members in the group, wherein index member setting means comprises:

predicting means for predicting degradation of the structural members belonging to each group based on design information of the structural members to estimate the degradation tendencies; and selecting means for selecting the at least one of the structural members from a part of the structural members having a high degradation tendency in each group on the basis of the result of predicting the degradation.

2. The maintenance managing apparatus as claimed in claim 1, wherein the predicting means predicts the degradation further based on operation information of the plant.

3. The maintenance managing apparatus as claimed in claim 2, wherein the predicting means predicts the degradation further based on maintenance history information of the plant.

* * * * *

UNITED STATES PATENT AND TRADEMARK OFFICE
CERTIFICATE OF CORRECTION

PATENT NO. : 7,328,133 B2
APPLICATION NO. : 11/506559
DATED : February 5, 2008
INVENTOR(S) : Kenji Utaka et al.

Page 1 of 1

It is certified that error appears in the above-identified patent and that said Letters Patent is hereby corrected as shown below:

On the title page in column 1, item (*) should read:

(*) Notice: Subject to any disclaimer, the term of this patent is extended or adjusted under 35 U.S.C. 154(b) by 0 days.

This patent is subject to a terminal disclaimer.

Signed and Sealed this

Twenty-ninth Day of December, 2009

David J. Kappos
*Director of the United States Patent and Trademark Office*